(12) United States Patent
Takaoka et al.

(10) Patent No.: US 11,447,933 B2
(45) Date of Patent: Sep. 20, 2022

(54) CONTROL SYSTEM FOR WORK VEHICLE, METHOD, AND WORK VEHICLE

(71) Applicant: KOMATSU LTD., Tokyo (JP)

(72) Inventors: Yukihisa Takaoka, Tokyo (JP); Kazuki Kure, Rolling Meadows, IL (US)

(73) Assignee: KOMATSU LTD., Tokyo (JP)

( * ) Notice: Subject to any disclaimer, the term of this patent is extended or adjusted under 35 U.S.C. 154(b) by 69 days.

(21) Appl. No.: 16/975,859

(22) PCT Filed: Feb. 27, 2019

(86) PCT No.: PCT/JP2019/007558
§ 371 (c)(1),
(2) Date: Aug. 26, 2020

(87) PCT Pub. No.: WO2019/239646
PCT Pub. Date: Dec. 19, 2019

(65) Prior Publication Data
US 2020/0407950 A1    Dec. 31, 2020

(30) Foreign Application Priority Data
Jun. 12, 2018    (JP) .............................. JP2018-112221

(51) Int. Cl.
*E02F 9/26*    (2006.01)
*E02F 9/20*    (2006.01)
(Continued)

(52) U.S. Cl.
CPC ............ *E02F 9/262* (2013.01); *E02F 9/2041* (2013.01); *G01C 21/3461* (2013.01);
(Continued)

(58) Field of Classification Search
CPC ......... E02F 9/262; E02F 9/2041; E02F 3/841; E02F 3/844; E02F 9/2228; E02F 9/2253;
(Continued)

(56) References Cited

U.S. PATENT DOCUMENTS 9,014,922 B2    4/2015 Edara et al.
2016/0069042 A1    3/2016 Wei et al.
(Continued)

FOREIGN PATENT DOCUMENTS

WO    2018/021347 A1    2/2018
WO    2018/084030 A1    5/2018

OTHER PUBLICATIONS

The International Search Report for the corresponding international application No. PCT/JP2019/007558, dated May 7, 2019.

*Primary Examiner* — Faris S Almatrahi
*Assistant Examiner* — Abdalla A Khaled
(74) *Attorney, Agent, or Firm* — Global IP Counselors, LLP

(57) ABSTRACT

A control system for a work vehicle includes a controller. The controller determines a work zone at a work site. The controller determines a target design topography at least partially positioned below an actual topography at the work site. The controller specifies a non-work zone. The non-work zone is a portion in which the actual topography is positioned below the target design topography in the work zone. The controller modifies the work zone based on the non-work zone. The controller generates a command signal to operate a work implement of the work vehicle according to the modified work zone and the target design topography.

19 Claims, 15 Drawing Sheets

(51) Int. Cl.
  *G01C 21/34* (2006.01)
  *G05D 1/00* (2006.01)
  *G05D 1/02* (2020.01)
  *E02F 3/84* (2006.01)
  *E02F 9/22* (2006.01)

(52) U.S. Cl.
  CPC ......... *G05D 1/0094* (2013.01); *G05D 1/0214* (2013.01); *E02F 3/841* (2013.01); *E02F 3/844* (2013.01); *E02F 9/2228* (2013.01); *E02F 9/2253* (2013.01); *E02F 9/2296* (2013.01); *G05D 2201/0202* (2013.01)

(58) Field of Classification Search
  CPC ......... E02F 9/2296; E02F 3/842; E02F 3/847; E02F 9/2045; G01C 21/3461; G05D 1/0094; G05D 1/0214; G05D 2201/0202; G05D 1/0274
  See application file for complete search history.

(56) References Cited

U.S. PATENT DOCUMENTS

| | | | |
|---|---|---|---|
| 2016/0076223 A1* | 3/2016 | Wei | ........................ E02F 9/205 |
| | | | 701/50 |
| 2019/0194912 A1 | 6/2019 | Ishibashi et al. | |
| 2020/0048871 A1* | 2/2020 | Nishizawa | .............. E02F 9/268 |

* cited by examiner

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2019/007558, filed on Feb. 27, 2019. This U.S. National stage application claims priority under 35 U.S.C. § 119(a) to Japanese Patent Application No. 2018-112221, filed in Japan on Jun. 12, 2018, the entire contents of which are hereby incorporated herein by reference.

BACKGROUND

Filed of the Invention

The present invention relates to a control system for a work vehicle, a method, and a work vehicle.

Background Information

A system for automatically controlling a work vehicle has been conventionally proposed for work vehicles such as bulldozers, graders, or the like. For example, in the system of U.S. Pat. No. 9,014,922, a controller predetermines a target profile along which a work implement is to operate at a work site from a topography or the like of the work site. The controller determines a plurality of cut locations so as to dig the work site divided into a plurality of work zones along the target profile. The controller starts digging from a determined cut location and operates the work implement along the target profile.

SUMMARY

An actual topography at a work site does not always have a smooth shape and may include an undulation. When a recess deeper than a target profile is included in a work zone of the actual topography, a soil amount to be dug by a work implement in the work zone decreases. As a result, the number of times of digging or a distance of digging increases, causing a reduction in work efficiency.

An object of the present invention is to prevent a reduction in work efficiency even when work is performed on an uneven topography under automatic control of a work vehicle.

A control system according to a first aspect is a control system for a work vehicle including a work implement. The control system includes a controller. The controller is programmed to execute the following processing. The controller determines a work zone at a work site. The controller determines a target design topography at least partially positioned below an actual topography at the work site. The controller specifies a non-work zone. The non-work zone is a portion in which the actual topography is positioned below the target design topography in the work zone. The controller modifies the work zone based on the non-work zone. The controller generates a command signal to operate the work implement according to the modified work zone and the target design topography.

A method according to a second aspect is a method executed by a controller in order to control a work vehicle including a work implement. The method includes the following processing. A first process is to determine a work zone at a work site. A second process is to determine a target design topography at least partially positioned below an actual topography at the work site. A third process is to specify a non-work zone. The non-work zone is a portion in which the actual topography is positioned below the target design topography in the work zone. A fourth process is to modify the work zone based on the non-work zone. A fifth process is to generate a command signal to operate the work implement according to the modified work zone and the target design topography.

A work vehicle according to a third aspect is a work vehicle including a work implement and a controller that controls the work implement. The controller is programmed to execute the following processing. The controller determines a work zone at a work site. The controller determines a target design topography at least partially positioned below an actual topography at the work site. The controller specifies a non-work zone. The non-work zone is a portion in which the actual topography is positioned below the target design topography in the work zone. The controller modifies the work zone based on the non-work zone. The controller generates a command signal to operate the work implement according to the modified work zone and the target design topography.

In the present invention, the work zone is modified based on the non-work zone. The non-work zone is a portion in which the actual topography is positioned below the target design topography. Therefore, the non-work zone is determined according to the size of a portion including a recess. Accordingly, the work zone can be determined according to the size of a portion including a recess in the actual topography. This enables to prevent a reduction in work efficiency even when work is performed on an uneven topography.

DETAILED DESCRIPTION OF EMBODIMENT(S)

Figure 1:
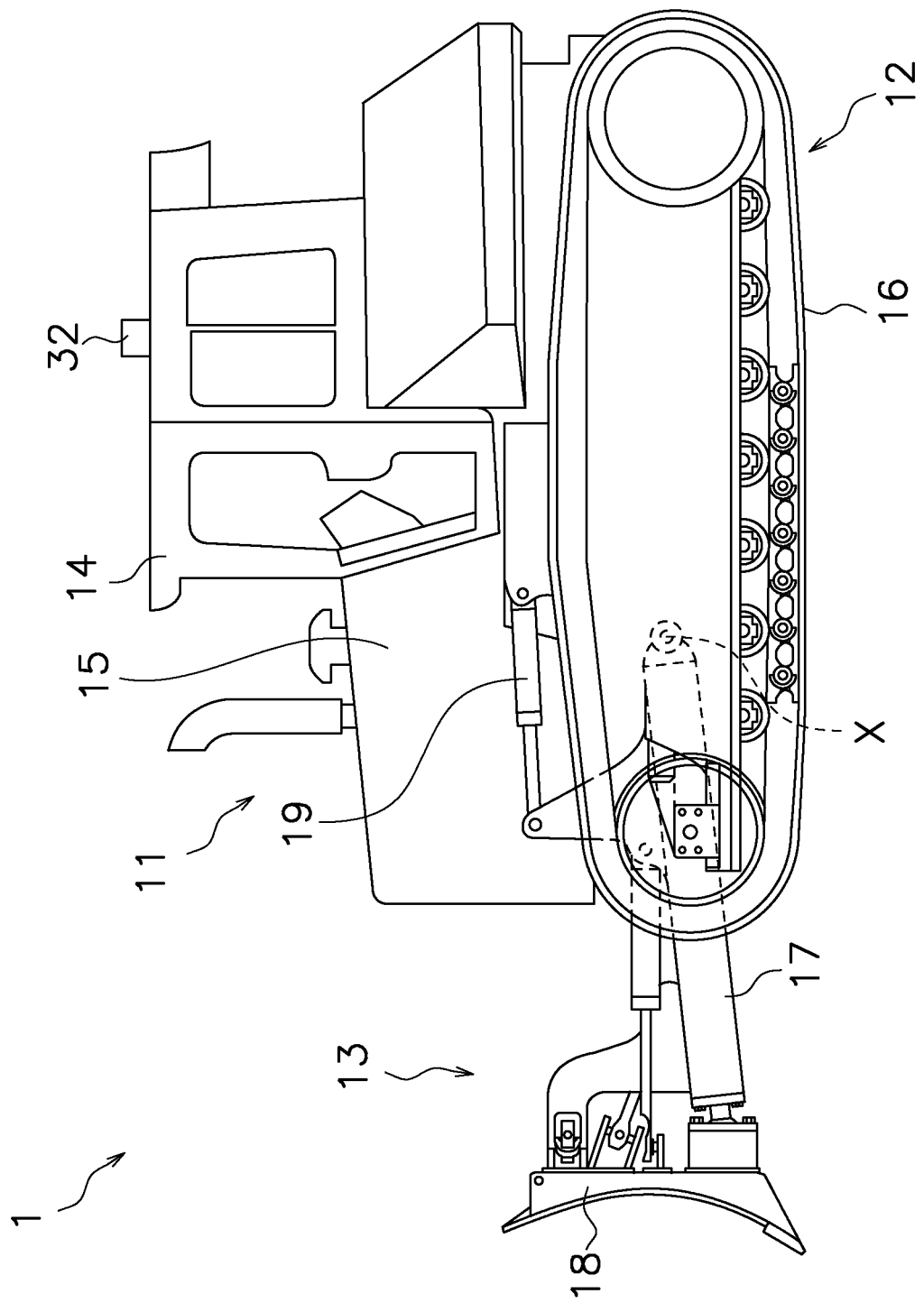
FIG. 1 is a side view of a work vehicle according to an embodiment.

A work vehicle according to an embodiment will now be described with reference to the drawings. FIG. 1 is a side view of a work vehicle 1 according to the embodiment. The work vehicle 1 according to the present embodiment is a bulldozer. The work vehicle 1 includes a vehicle body 11, a travel device 12, and a work implement 13.

The vehicle body 11 includes an operating cabin 14 and an engine compartment 15. An operator's seat that is not illustrated is disposed in the operating cabin 14. The engine compartment 15 is disposed in front of the operating cabin 14. The travel device 12 is attached to a bottom portion of the vehicle body 11. The travel device 12 includes a pair of right and left crawler belts 16. Only the left crawler belt 16 is illustrated in FIG. 1. The work vehicle 1 travels due to the rotation of the crawler belts 16.

The work implement 13 is attached to the vehicle body 11. The work implement 13 includes a lift frame 17, a blade 18, and a lift cylinder 19. The lift frame 17 is attached to the vehicle body 11 so as to be movable up and down around an axis X extending in the vehicle width direction. The lift frame 17 supports the blade 18.

The blade 18 is disposed in front of the vehicle body 11. The blade 18 moves up and down as the lift frame 17 moves up and down. The lift frame 17 may be attached to the travel device 12. The lift cylinder 19 is coupled to the vehicle body 11 and the lift frame 17. Due to the extension and contraction of the lift cylinder 19, the lift frame 17 rotates up and down around the axis X.

Figure 2:
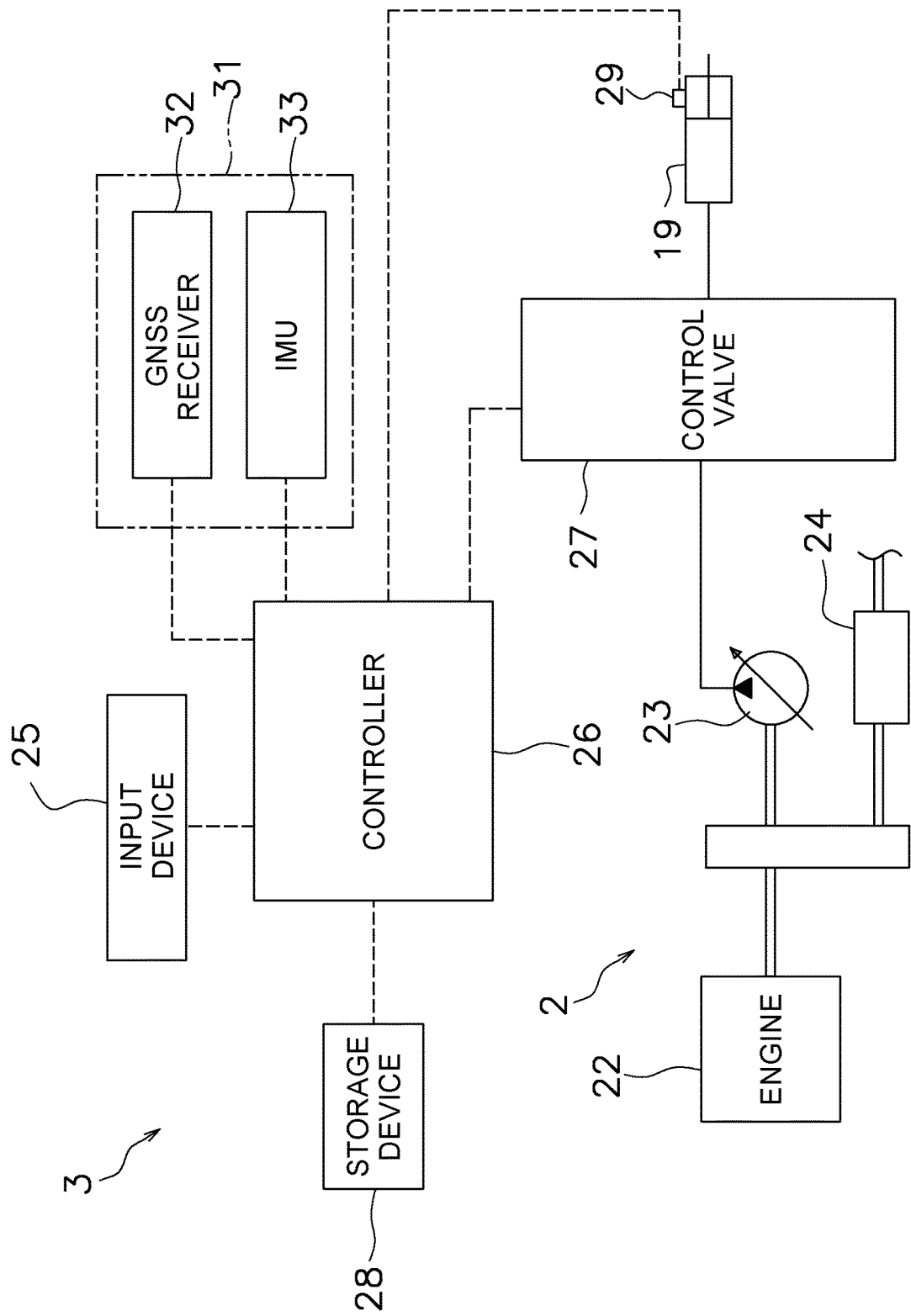
FIG. 2 is a block diagram illustrating a configuration of a drive system and a control system of the work vehicle.

FIG. 2 is a block diagram illustrating a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. Although only one hydraulic pump 23 is illustrated in FIG. 2, a plurality of hydraulic pumps may be provided.

The power transmission device 24 transmits driving force of the engine 22 to the travel device 12. The power transmission device 24 may be a hydro static transmission (HST), for example. Alternatively, the power transmission device 24 may be, for example, a torque converter or a transmission having a plurality of transmission gears.

The control system 3 includes an input device 25, a controller 26, a storage device 28, and a control valve 27. The input device 25 is disposed in the operating cabin 14. The input device 25 is a device for setting automatic control of the work vehicle 1 as described later. The input device 25 receives an operation by the operator and outputs an operation signal corresponding to the operation. An operation signal of the input device 25 is output to the controller 26.

The input device 25 includes, for example, a touch screen type display. However, the input device 25 is not limited to a touch screen type, and may include hardware keys. The input device 25 may be disposed at a location (for example, a control center) that is away from the work vehicle 1. The operator may operate the work vehicle 1 from the input device 25 in the control center via wireless communication.

The controller 26 is programmed to control the work vehicle 1 based on acquired data. The controller 26 includes, for example, a processor such as a CPU. The controller 26 acquires an operation signal from the input device 25. The controller 26 is not limited to one unit and may be divided into a plurality of controllers. The controller 26 causes the work vehicle 1 to travel by controlling the travel device 12 or the power transmission device 24. The controller 26 moves the blade 18 up and down by controlling the control valve 27.

The control valve 27 is a proportional control valve and is controlled by a command signal from the controller 26. The control valve 27 is disposed between a hydraulic actuator such as the lift cylinder 19 and the hydraulic pump 23. The control valve 27 controls the flow rate of the hydraulic fluid supplied from the hydraulic pump 23 to the lift cylinder 19. The controller 26 generates a command signal to the control valve 27 so that the blade 18 operates. As a result, the lift cylinder 19 is controlled. The control valve 27 may be a pressure proportional control valve. Alternatively, the control valve 27 may be an electromagnetic proportional control valve.

Figure 3:
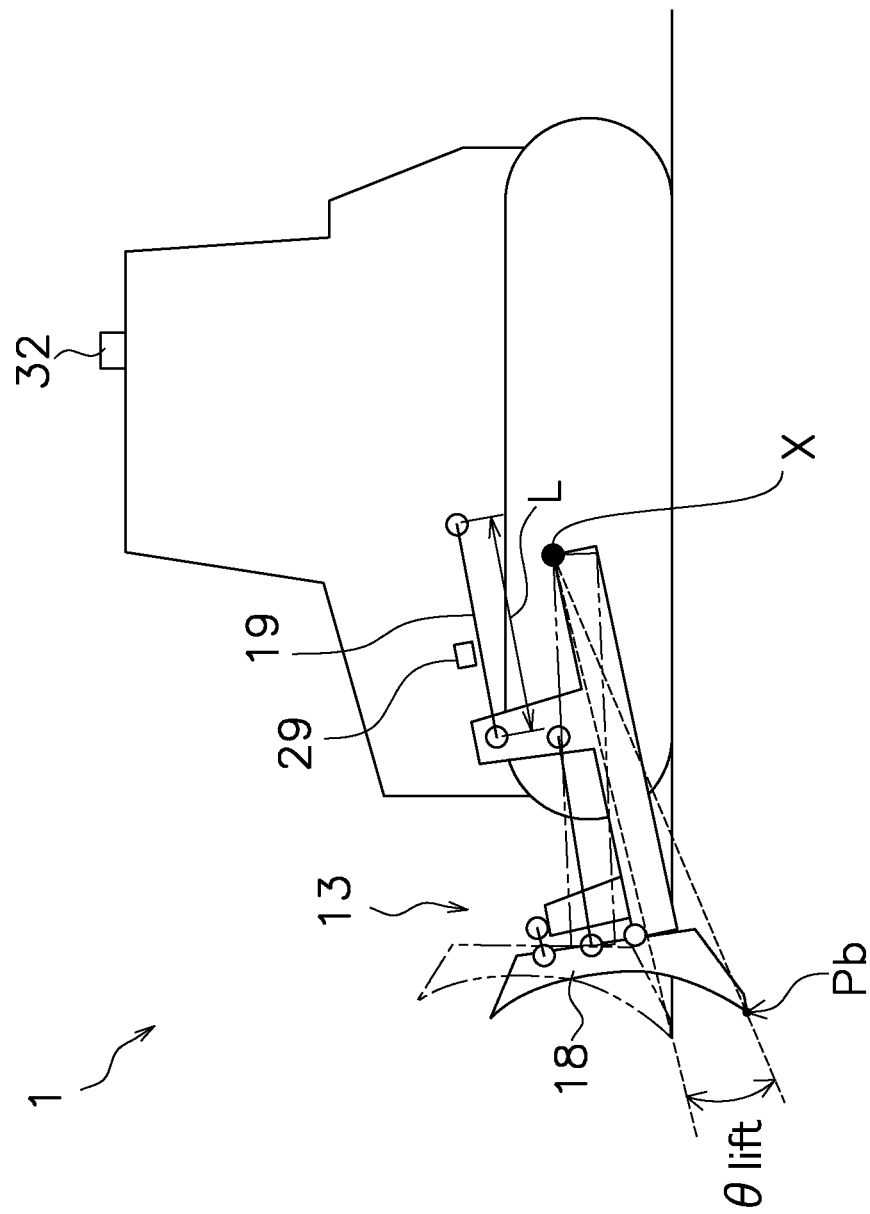
FIG. 3 is a schematic view of a configuration of the work vehicle.

The control system 3 includes a work implement sensor 29. The work implement sensor 29 senses a position of the work implement 13 and outputs a position signal indicating the position of the work implement 13. The work implement sensor 29 may be a displacement sensor that senses the displacement of the work implement 13. Specifically, the work implement sensor 29 senses the stroke length of the lift cylinder 19 (hereinafter referred to as "lift cylinder length L"). As illustrated in FIG. 3, the controller 26 calculates a lift angle θlift of the blade 18 based on the lift cylinder length L. The work implement sensor 29 may be a rotation sensor that directly senses the rotation angle of the work implement 13.

FIG. 3 is a schematic view of a configuration of the work vehicle 1. In FIG. 3, a reference position of the work implement 13 is indicated by a chain double-dashed line. The reference position of the work implement the 13 is the position of the blade 18 in a state where the tip of the blade 18 is in contact with the ground surface on a horizontal ground surface. The lift angle θlift is the angle from the reference position of the work implement 13.

As illustrated in FIG. 2, the control system 3 includes a position sensor 31. The position sensor 31 measures a position of the work vehicle 1. The position sensor 31 includes a global navigation satellite system (GNSS) receiver 32 and an IMU 33. The GNSS receiver 32 is, for example, a receiver for global positioning system (GPS). For example, an antenna of the GNSS receiver 32 is disposed on the operating cabin 14. The GNSS receiver 32 receives a positioning signal from a satellite and calculates the position of the antenna based on the positioning signal to generate vehicle body position data. The controller 26 acquires the vehicle body position data from the GNSS receiver 32. The controller 26 acquires the traveling direction and vehicle speed of the work vehicle 1 from the vehicle body position data.

The vehicle body position data may not be data of the antenna position. The vehicle body position data may be data indicating the position of any location whose relationship with the antenna position is fixed in the work vehicle 1 or at the surroundings of the work vehicle 1.

The IMU 33 is an inertial measurement unit. The IMU 33 acquires vehicle body inclination angle data. The vehicle body inclination angle data includes an angle (pitch angle) with respect to the horizontal in the vehicle longitudinal direction and an angle (roll angle) with respect to the horizontal in the vehicle lateral direction. The controller 26 acquires the vehicle body inclination angle data from the IMU 33.

The controller 26 calculates a blade tip position Pb from the lift cylinder length L, the vehicle body position data, and the vehicle body inclination angle data. As illustrated in FIG. 3, the controller 26 calculates the global coordinates of the GNSS receiver 32 based on the vehicle body position data. The controller 26 calculates the lift angle θ lift based on the lift cylinder length L. The controller 26 calculates the local coordinates of the blade tip position Pb with respect to the GNSS receiver 32 based on the lift angle θlift and vehicle body dimension data. The vehicle body dimension data is stored in the storage device 28 and indicates the position of the work implement 13 with respect to the GNSS receiver 32. The controller 26 calculates the global coordinates of the blade tip position Pb based on the global coordinates of the GNSS receiver 32, the local coordinates of the blade tip position Pb, and the vehicle body inclination angle data. The controller 26 acquires the global coordinates of the blade tip position Pb as blade tip position data.

The storage device 28 includes, for example, a memory and an auxiliary storage device. The storage device 28 may be a RAM, a ROM, or the like. The storage device 28 may be a semiconductor memory, a hard disk, or the like. The storage device 28 is an example of a non-transitory computer-readable recording medium. The storage device 28 stores computer commands that are executable by the processor and for controlling the work vehicle 1.

The storage device 28 stores design topography data and work site topography data. The design topography data indicates a final design topography. The final design topography is a final target shape of a surface of the work site. The design topography data is, for example, a construction drawing in a three-dimensional data format. The work site topography data indicates a wide topography of the work site. The work site topography data is, for example, an actual topography survey map of a three-dimensional data format. The work site topography data can be acquired by aerial laser survey, for example.

The controller 26 acquires actual topography data. The actual topography data indicates an actual topography of the work site. The actual topography of the work site is a topography of a region along the travel direction of the work vehicle 1. The actual topography data is acquired by computing with the controller 26 from the work site topography data and the position and traveling direction of the work vehicle 1 acquired from the aforementioned position sensor 31. The actual topography data may be acquired by surveying the actual topography by means of onboard laser imaging detection and ranging (LIDAR) or the like.

The controller 26 automatically controls the work implement 13 based on the actual topography data, the design topography data, and the blade tip position data. The automatic control of the work implement 13 may be semi-automatic control performed in combination with manual operation by the operator. Alternatively, the automatic control of the work implement 13 may be fully automatic control performed without manual operation by the operator. The traveling of the work vehicle 1 may be automatically controlled by the controller 26. For example, the traveling control of the work vehicle 1 may be fully automatic control performed without manual operation by the operator. Alternatively, the traveling control may be semi-automatic control performed in combination with manual operation by the operator. Alternatively, the traveling of the work vehicle 1 may be performed by manual operation by the operator.

Figure 4:
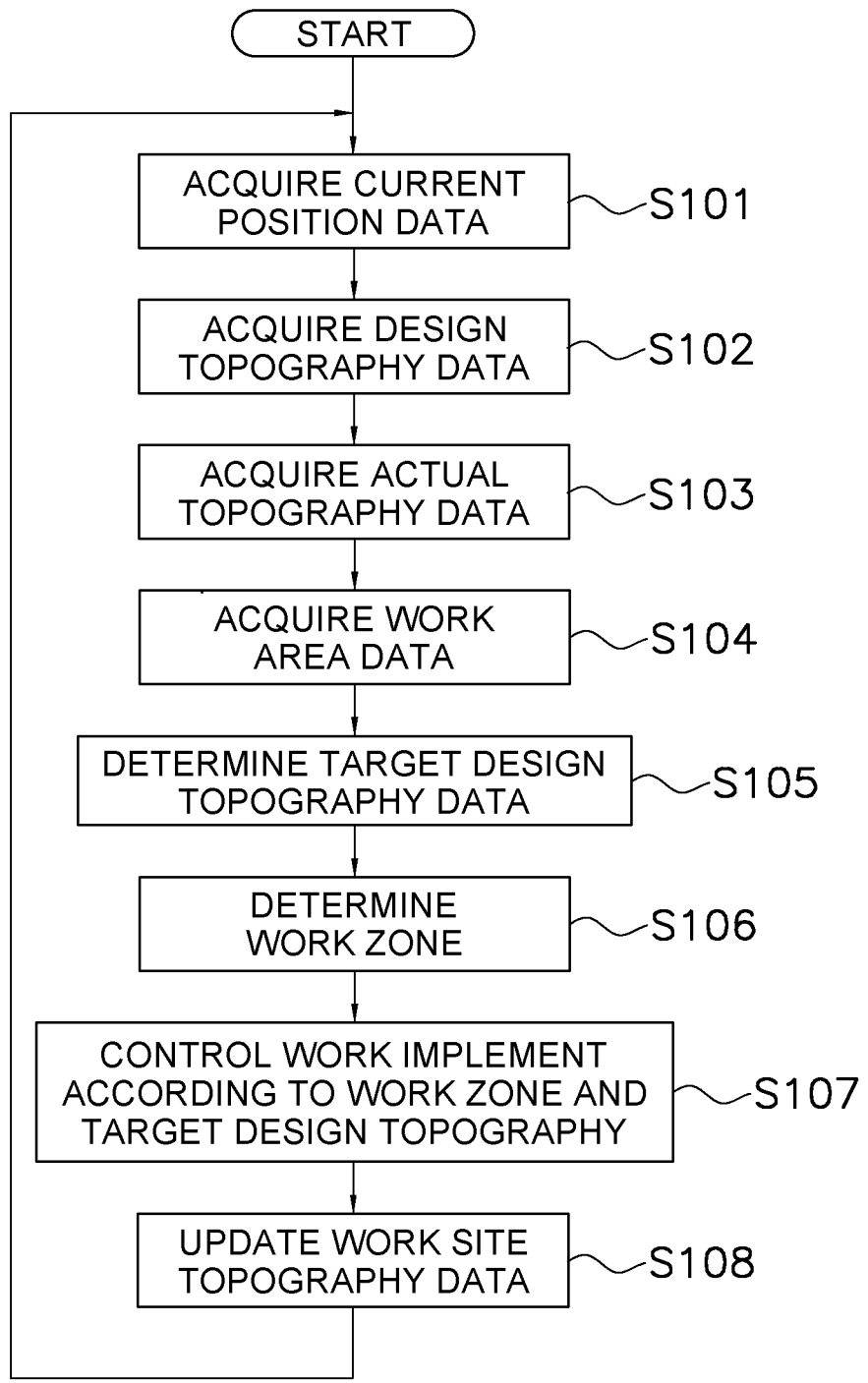
FIG. 4 is a flowchart illustrating processing of automatic control of the work vehicle.

The automatic control of the work vehicle 1 in digging executed by the controller 26 will be described below. In the following description, for example, the work vehicle 1 travels back and forth on each slot in slot dozing to perform digging of each slot. FIG. 4 is a flowchart illustrating processing of automatic control according to a first embodiment.

As illustrated in FIG. 4, in step S101, the controller 26 acquires current position data. At this time, the controller 26 acquires the current blade tip position Pb of the blade 18 as described above.

Figure 5:
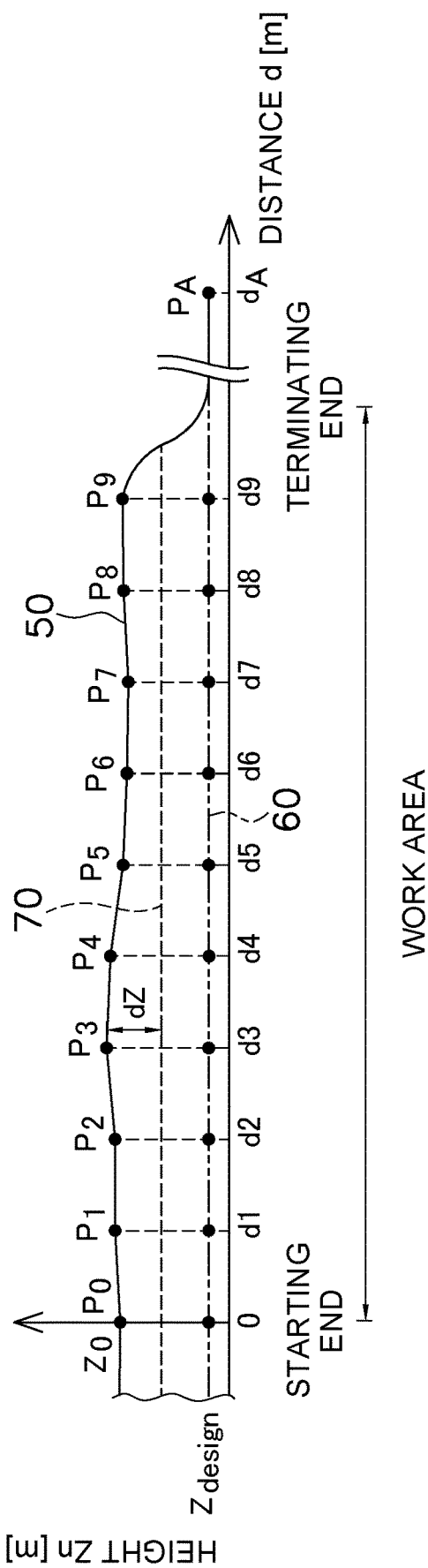
FIG. 5 is a diagram illustrating examples of a final design topography, an actual topography, and a target design topography.

In step S102, the controller 26 acquires design topography data. As illustrated in FIG. 5, the design topography data includes a height Zdesign of a final design topography 60 at a plurality of reference points Pn (n=0, 1, 2, 3, . . . , A) in the traveling direction of the work vehicle 1. The plurality of reference points Pn indicate a plurality of points at a predetermined interval along the traveling direction of the work vehicle 1. The plurality of reference points Pn are on a travel path of the blade 18. While the final design topography 60 has a shape that is flat and parallel to the horizontal direction in FIG. 5, the shape of the final design topography may be different.

In step S103, the controller 26 acquires actual topography data. The controller 26 acquires the actual topography data by computation from work site topography data acquired from the storage device 28 and the vehicle body position data and traveling direction data acquired from the position sensor 31.

The actual topography data is information which indicates a topography positioned in the traveling direction of the work vehicle 1. FIG. 5 illustrates a cross section of an actual topography 50. In FIG. 5, the vertical axis indicates the height of the topography and the horizontal axis indicates the distance from the current position in the traveling direction of the work vehicle 1.

Specifically, the actual topography data includes the height Zn of the actual topography 50 at the plurality of reference points Pn from the current position to a predetermined topography recognition distance dA in the traveling direction of the work vehicle 1. In the present embodiment, the current position is the position determined based on the current blade tip position Pb of the work vehicle 1. The current position may also be determined based on the current position of another portion of the work vehicle 1. The plurality of reference points are aligned at a predetermined interval, for example, every one meter.

In step S104, the controller 26 acquires work area data. The work area data indicates a work area set by the input device 25. As illustrated in FIG. 5, the work area includes a starting end and a terminating end. The work area data includes the coordinates of the starting end and the coordinates of the terminating end. Alternatively, the work area data may include the coordinates of the starting end and the length of the work area, and the coordinates of the terminating end may be calculated from the coordinates of the starting end and the length of the work area. Alternatively, the work area data may include the coordinates of the terminating end and the length of the work area, and the coordinates of the starting end may be calculated from the coordinates of the terminating end and the length of the work area.

The controller 26 acquires the work area data based on an operation signal from the input device 25. The controller 26 may acquire the work area data by another method. For example, the controller 26 may acquire the work area data from an external computer that performs construction management of the work site.

In step S105, the controller 26 determines target design topography data. The target design topography data indicates a target design topography 70 illustrated by a dashed line in FIG. 5. The target design topography 70 indicates a desired trajectory of the tip of the blade 18 in work. The target design topography 70 is a target profile of a topography to be worked, and indicates a desired shape as a result of digging work.

As illustrated in FIG. 5, the controller 26 determines the target design topography 70 at least partially positioned below the actual topography 50. For example, the controller 26 determines the target design topography 70 extending in the horizontal direction. The controller 26 generates the target design topography 70 displaced by a predetermined distance dZ downward from the actual topography 50. The predetermined distance dZ may be set based on an operation signal from the input device 25. The predetermined distance dZ may be acquired from an external computer that performs construction management of the work site. The predetermined distance dZ may be a fixed value.

The controller 26 determines the target design topography 70 so as not to go below the final design topography 60. Therefore, the controller 26 determines the target design topography 70 positioned at or above the final design topography 60 and below the actual topography 50 during digging work.

Figure 6:
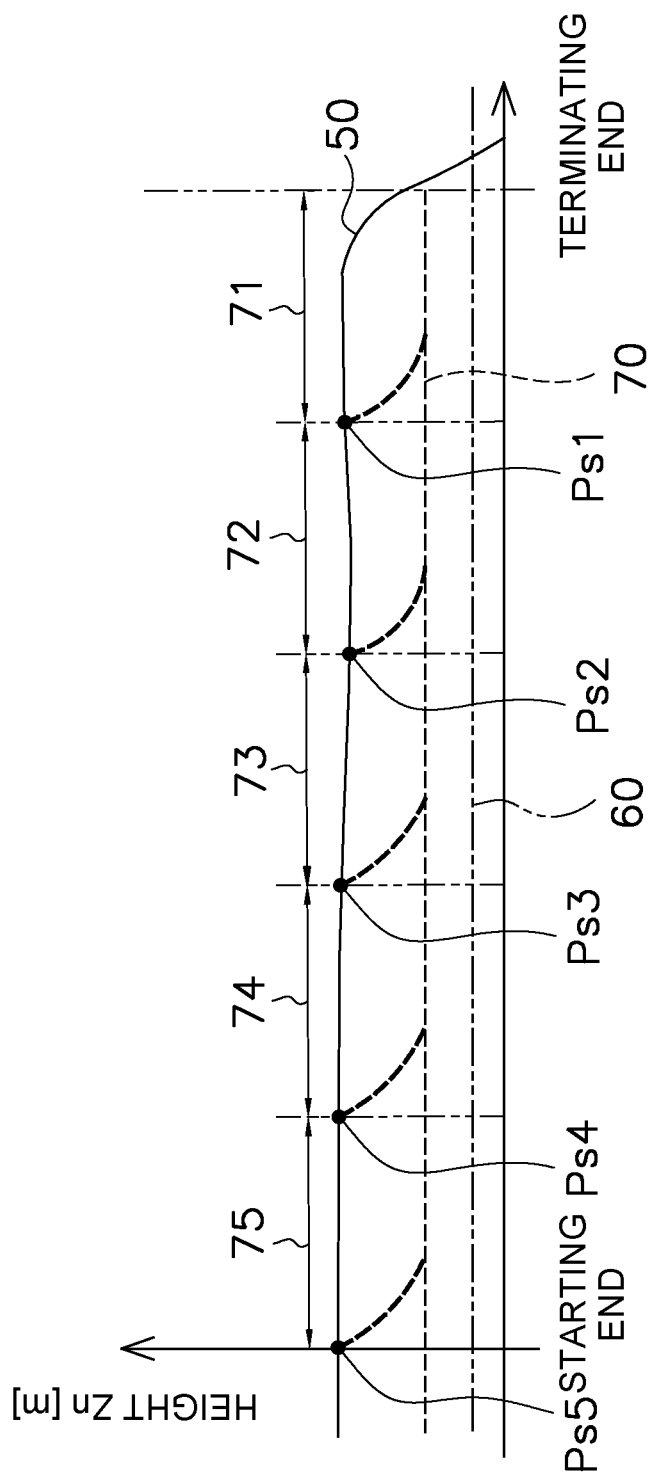
FIG. 6 is a diagram illustrating examples of a plurality of work zones and start positions of the work zones.

In step S106, the controller 26 determines work zones 71 to 75. As illustrated in FIG. 6, the controller 26 determines a plurality of work zones 71 to 75 aligned in the traveling direction of the work vehicle 1. Each of the work zones 71 to 75 is the zone in which work for one cut by the blade 18 is performed. A method for determining the work zones 71 to 75 will be described later in detail.

In step S107, the controller 26 controls the work implement 13 according to the work zones 71 to 75 and the target design topography 70. The controller 26 performs work according to the target design topography 70 for each of the work zones 71 to 75 determined in step S106. Specifically, the controller 26 starts work from start positions Ps1 to Ps5 of the work zones, and generates a command signal to the work implement 13 so that the blade tip position of the blade 18 moves according to the target design topography 70. The generated command signal is input to the control valve 27. As a result, the blade tip position Pb of the blade 18 moves from each of the start positions Ps1 to Ps5 toward the target design topography 70.

When the digging of one work zone 71 from a first start position Ps1 is completed, the controller 26 moves the work vehicle 1 to a second start position Ps2 and digs a next work zone 72. When the digging of the work zone 72 is completed, the controller 26 moves the work vehicle 1 to a third start position Ps3 and digs a next work zone 73. By repeating the above work, the digging of one target design topography 70 is completed in the work area.

When the digging of one target design topography 70 is completed in the work area, the controller 26 determines the start positions of work for each work zone and the working order thereof for a next target design topography 70 positioned further below, and then starts the digging of each work zone. By repeating the aforementioned processing, the digging is performed so that the actual topography 50 approaches the final design topography 60.

In step S108, the controller 26 updates the work site topography data. The controller 26 updates the work site topography data with position data which indicates the most recent trajectory of the blade tip position Pb. The update of the work site topography data may be performed as needed. Alternatively, the controller 26 may calculate the position of the bottom surface of the crawler belts 16 from the vehicle body position data and the vehicle body dimension data and update the work site topography data with the position data that indicates the trajectory of the bottom surface of the crawler belts 16. In this case, the update of the work site topography data can be performed instantly.

Alternatively, the work site topography data may be generated from survey data measured by a survey device outside of the work vehicle 1. For example, aerial laser survey may be used as an external survey device. Alternatively, the actual topography 50 may be imaged by a camera and the work site topography data may be generated from image data captured by the camera. For example, aerial photographic survey performed with an unmanned aerial vehicle (UAV) may be used. In the case of an external survey device or camera, the update of the work site topography data may be performed at a predetermined interval or as needed.

Figure 7:
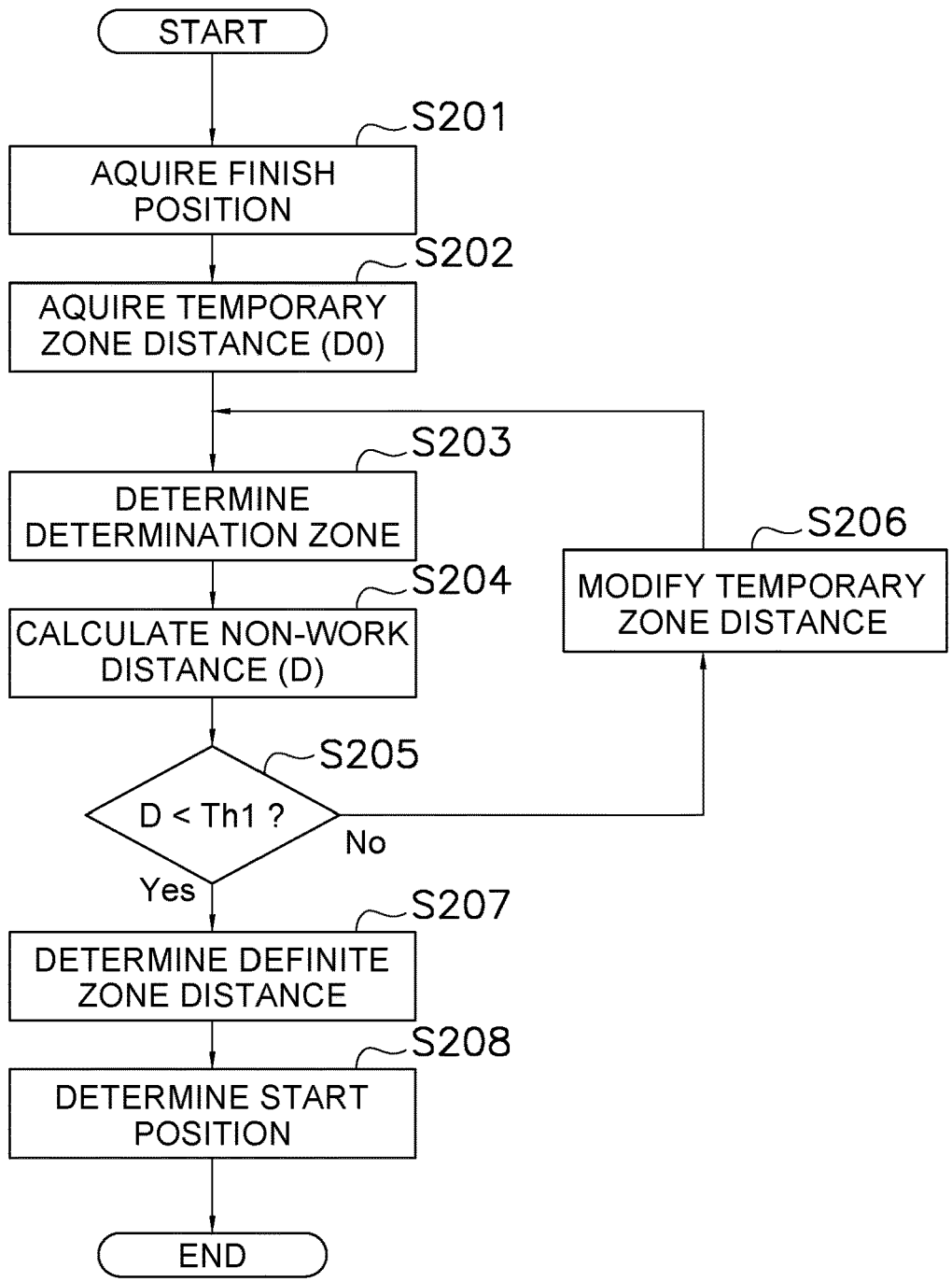
FIG. 7 is a flowchart illustrating processing for determining a work zone according to a first embodiment.
Figure 8:
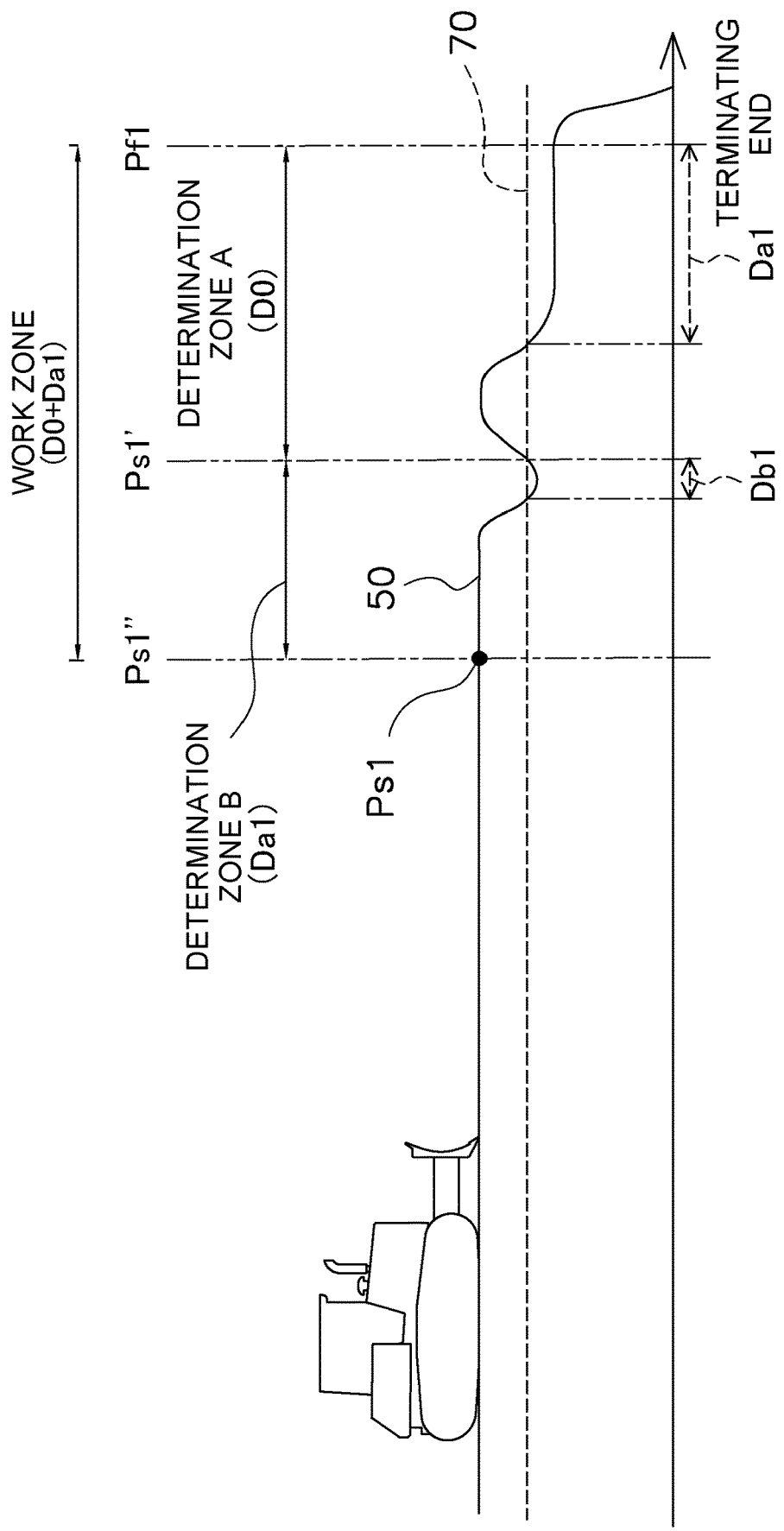
FIG. 8 is a diagram illustrating an example of a method for determining the work zone.

Next, a method for determining the work zone is described. FIG. 7 is a flowchart illustrating processing for determining the work zone. FIG. 8 is a diagram illustrating a method for determining the work zone. As illustrated in FIG. 7, in step S201, the controller 26 acquires a finish position Pf1 of the work zone. The controller 26 acquires the finish position Pf1 from the storage device 28.

In step S202, the controller 26 acquires a temporary zone distance D0 in the work zone. The controller 26 acquires the temporary zone distance D0 from the storage device 28. The zone distance D0 is the length of the work zone in the traveling direction of the work vehicle 1. The temporary zone distance D0 may be a constant value. The temporary zone distance D0 may be determined by the controller 26 according to the capacity of the blade 18, the machine capability of the work vehicle 1, or the like.

In step S203, the controller 26 determines a determination zone. As illustrated in FIG. 8, the controller 26 determines, as a temporary start position Ps1', a position away backward from the finish position Pf1 in the traveling direction of the work vehicle 1 by the temporary zone distance D0. The controller 26 determines, as a determination zone A, the zone between the finish position Pf1 and the temporary start position Ps1'. While the finish position Pf1 coincides with the position of the terminating end in FIG. 8, the finish position Pf1 may be the position determined from the start position of the previous work zone.

Figure 9:
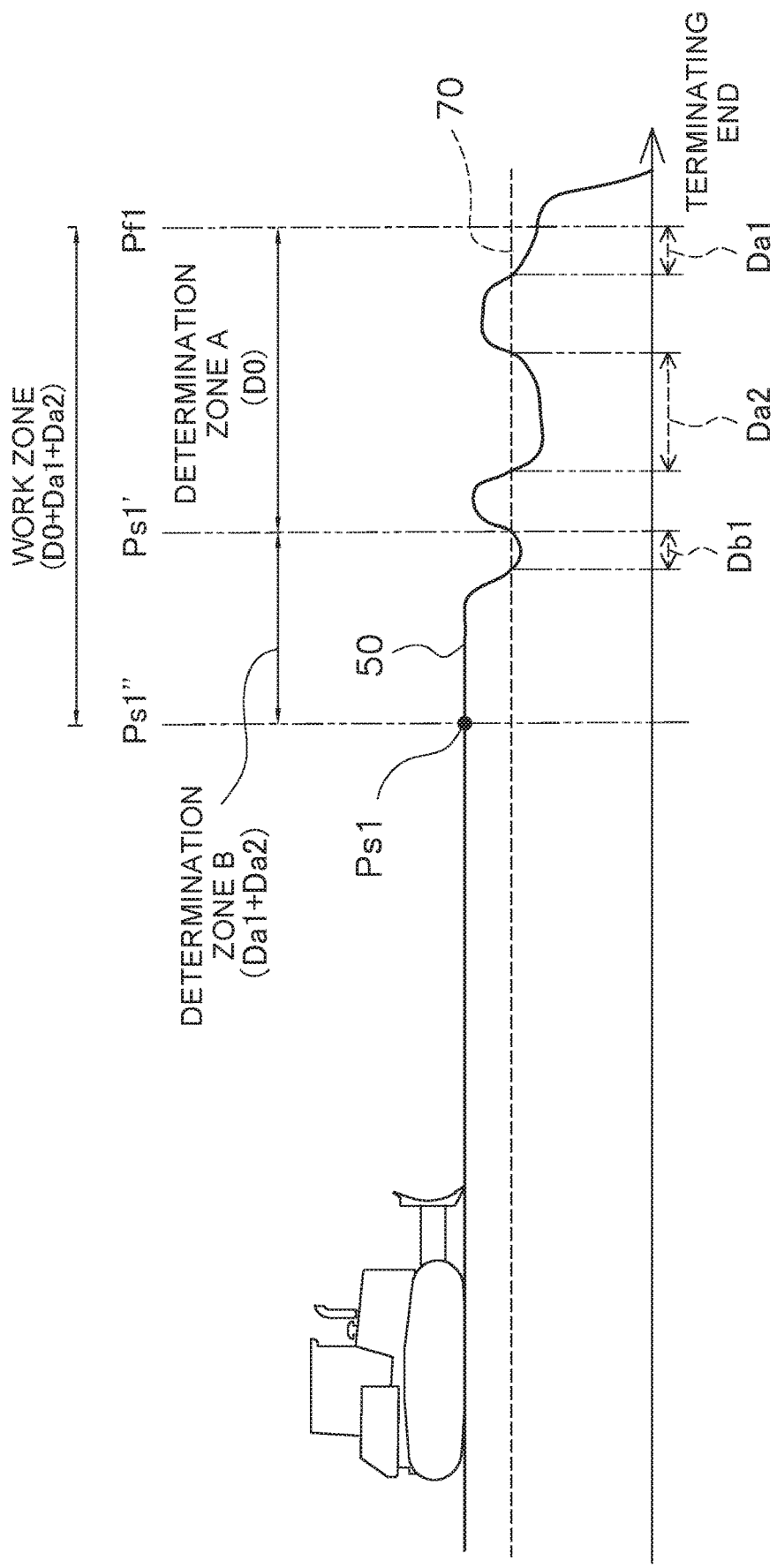
FIG. 9 is a diagram illustrating an example of a method for determining the work zone.

In step S204, the controller 26 calculates a non-work distance D. The non-work distance D is the distance of a non-work zone. The non-work zone is specified as the zone in which the actual topography 50 is positioned below the target design topography 70 in the determination zone determined in step S203. The non-work distance D is the distance of the portion in which the actual topography 50 is positioned below the target design topography 70 in the determination zone determined in step S203. The non-work distance D may be the total distance of the portions of the target design topography 70 in the zone where the actual topography 50 is positioned below the target design topography 70 in the determination zone. In FIG. 8, the non-work distance D in the determination zone A is Da1. When the work zone includes a plurality of portions in which the actual topography 50 is positioned below the target design topography 70, the total distance of the plurality of portions is calculated as the non-work distance. For example, as illustrated in FIG. 9, when the determination zone A includes a plurality of portions in which the actual topography 50 is positioned below the target design topography 70, the controller 26 calculates the sum of the distances Da1 and Da2 of the portions as the non-work distance D in the determination zone A.

In step S205, a determination is made as to whether the non-work distance D is less than a predetermined threshold Th1. Preferably, the predetermined threshold Th1 is a value set in consideration of work efficiency. The predetermined threshold Th1 may be a constant value. Alternatively, the predetermined threshold Th1 may be changeable by the operation of the operator. Alternatively, the predetermined threshold Th1 may be determined by the controller 26. When the non-work distance D is not less than the predetermined threshold Th1, that is to say, when the non-work distance D is equal to or greater than the predetermined threshold Th1, the process proceeds to step S206.

In step S206, the controller 26 modifies the temporary zone distance. The controller 26 increases the temporary zone distance according to the non-work distance D. As illustrated in FIG. 8, the controller 26 modifies the temporary zone distance into D0+Da1 by adding the non-work distance Da1 in the determination zone A to the temporary zone distance D0 of the determination zone A.

Next, the process returns to step S203 and the controller 26 determines a next determination zone. As illustrated in FIG. 8, the controller 26 modifies the temporary start position into a position Ps1" away backward from the finish position Pf1 in the traveling direction of the work vehicle 1 by the temporary zone distance (D0+Da1). The controller 26 determines, as a next determination zone B, the zone between the temporary start position Ps1' before modification and the modified temporary start position Ps1".

In step S204, the controller 26 calculates a non-work distance D in the determination zone B. As illustrated in FIG. 8, the non-work distance D in the determination zone B is Db1. In step S205, the controller 26 determines whether the non-work distance D (=Db1) in the determination zone B is less than the predetermined threshold Th1. When the non-work distance D (=Db1) in the determination zone B is less than the predetermined threshold Th1, the process proceeds to step S207.

In step S207, the controller 26 determines a definite zone distance. The controller 26 determines, as the definite zone distance, the temporary zone distance when the non-work distance becomes less than a predetermined threshold. As illustrated in FIG. 8, when the non-work distance D (=Db1) in the determination zone B is less than the predetermined threshold Th1, the controller 26 determines the temporary zone distance (D0+Da1) as the definite zone distance.

In step S208, the controller 26 determines a start position. The controller 26 determines, as a final start position Ps1, the position Ps1" away backward from the finish position Pf1 by the definite zone distance (D0+Da1). The other start positions Ps2, Ps3, . . . are also determined by the same processing as described above.

When the non-work distance D (=Db1) in the determination zone B is equal to or greater than the predetermined threshold Th1, the processes of step S203 to S206 are repeated until the non-work distance D becomes less than the predetermined threshold Th1. Then, the controller 26 determines, as the definite zone distance, the temporary zone distance when the non-work distance D becomes less than the predetermined threshold Th1.

Figure 10:
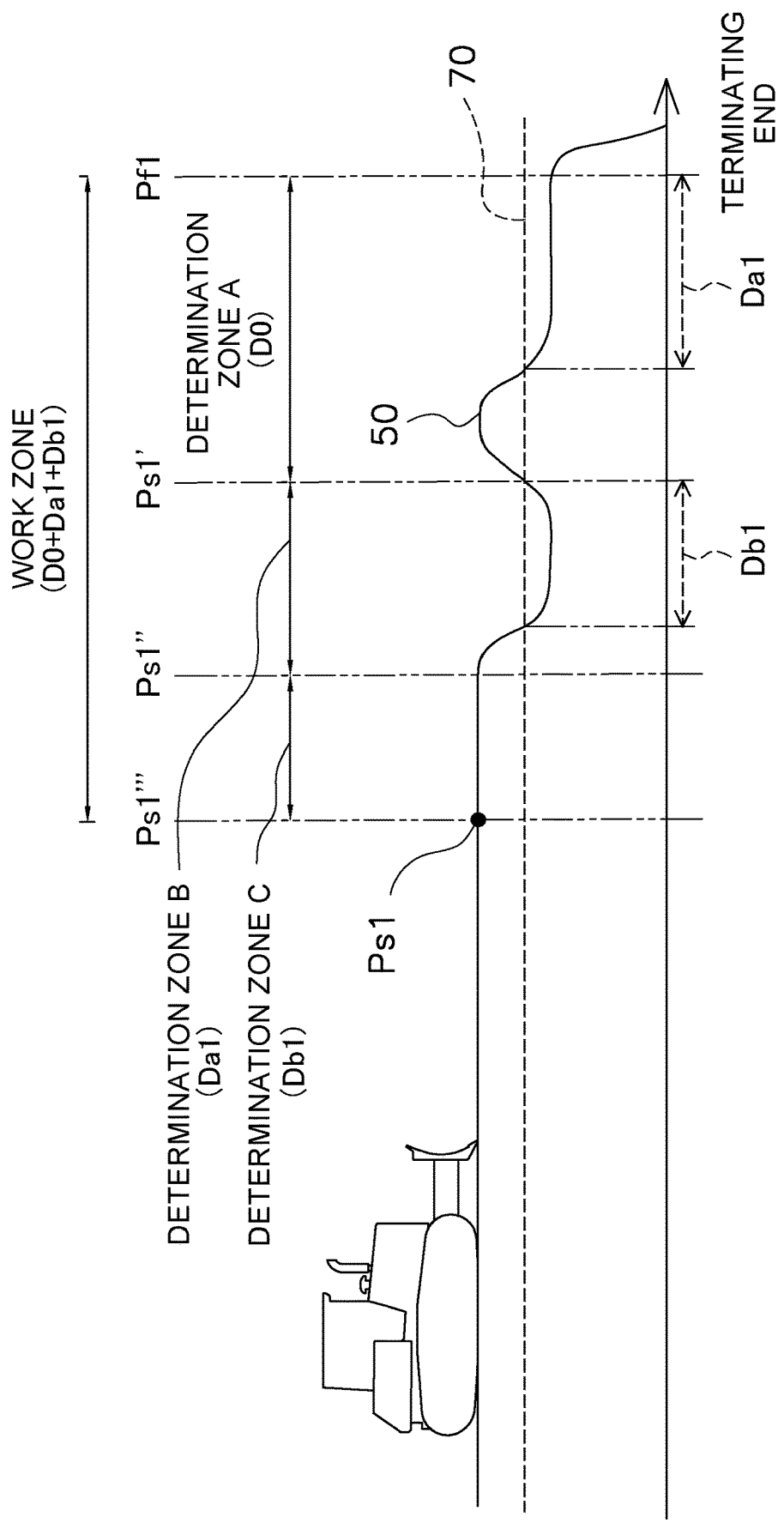
FIG. 10 is a diagram illustrating an example of a method for determining the work zone.

For example, as illustrated in FIG. 10, when the non-work distance D (=Db1) in the determination zone B is equal to or greater than the predetermined threshold Th1, the controller 26 further increases the temporary zone distance by the non-work distance Db1 to determine a next determination zone C. The controller 26 determines whether the non-work distance D in the determination zone C is less than the predetermined threshold Th1. When the non-work distance D in the determination zone C is less than the predetermined threshold Th1, the controller 26 determines the temporary zone distance (D0+Da1+Db1) as the definite zone distance. Then, the controller 26 determines, as the final start position Ps1, a position Ps1''' away backward from the finish position Pf1 by the temporary zone distance (D0+Da1+Db1).

In FIG. 8, when the non-work distance D (=Da1) in the determination zone A is less than the predetermined threshold Th1, the controller 26 does not modify the temporary zone distance D0 in the determination zone A and determines the temporary zone distance D0 in the determination zone A as the definite zone distance. Then, the controller 26 determines the temporary start position Ps1' as the final start position Ps1.

In the control system 3 of the work vehicle 1 according to the present embodiment described above, the zone distance D0 is modified based on the non-work distance D. Accordingly, the start position Ps1 is modified and the work zone is modified. Specifically, the zone distance D0 increases as the non-work distance D increases. Therefore, the start position Ps1 is modified to position backward in the traveling direction of the work vehicle 1, and this increases the work zone. Accordingly, the work zone can be determined according to the size of a portion including a recess in the actual topography 50. As a result, a reduction in work efficiency can be prevented even when work is performed on an uneven topography.

Although the embodiment of the present invention has been described so far, the present invention is not limited to the above embodiment and various modifications may be made within the scope of the invention.

The work vehicle 1 is not limited to a bulldozer, and may be another vehicle such as a wheel loader, a motor grader, or a hydraulic excavator.

The work vehicle 1 may be remotely operable. In this case, a portion of the control system 3 may be disposed outside of the work vehicle 1. For example, the controller 26 may be disposed outside of the work vehicle 1. The controller 26 may be disposed in a control center that is away from the work site. In this case, the work vehicle 1 may be a vehicle that does not include the operating cabin 14.

The work vehicle 1 may be a vehicle driven by an electric motor. In this case, a power source may be disposed outside the work vehicle 1. The work vehicle 1 with which the power source is supplied from outside may be a vehicle without an internal combustion engine and an engine compartment.

Figure 11:
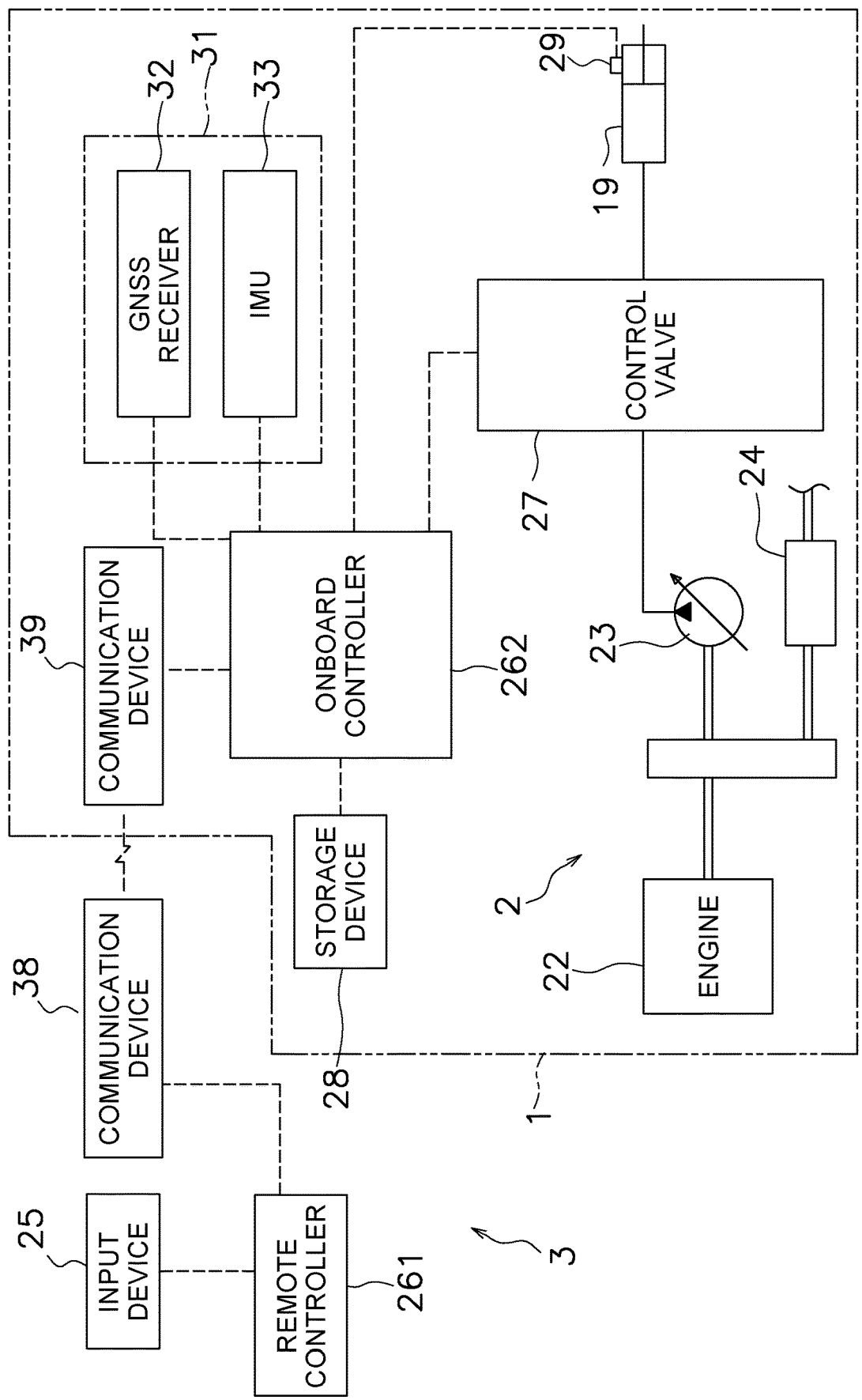
FIG. 11 is a block diagram illustrating a configuration according to a first modified example of the control system.

The controller 26 may have a plurality of controllers 26 separated from one another. For example, as illustrated in FIG. 11, the controller 26 may include a remote controller 261 disposed outside of the work vehicle 1 and an onboard controller 262 mounted on the work vehicle 1. The remote controller 261 and the onboard controller 262 may be able to communicate wirelessly via communication devices 38 and 39. A portion of the aforementioned functions of the controller 26 may be executed by the remote controller 261, and the remaining functions may be executed by the onboard controller 262. For example, the processing for determining the target design topography 70 and the working order may be executed by the remote controller 261, and the processing for outputting a command signal to the work implement 13 may be executed by the onboard controller 262.

The input device 25 may be disposed outside the work vehicle 1. In this case, the operating cabin may be omitted from the work vehicle 1. Alternatively, the input device 25 may be omitted from the work vehicle 1. The input device 25 may include an operating member such as an operating lever, a pedal, a switch for operating the travel device 12 and/or the work implement 13. The traveling back and forth of the work vehicle 1 may be controlled according to the operation of the input device 25. The operation such as raising and lowering of the work implement 13 may be controlled according to the operation of the input device 25.

Figure 12:
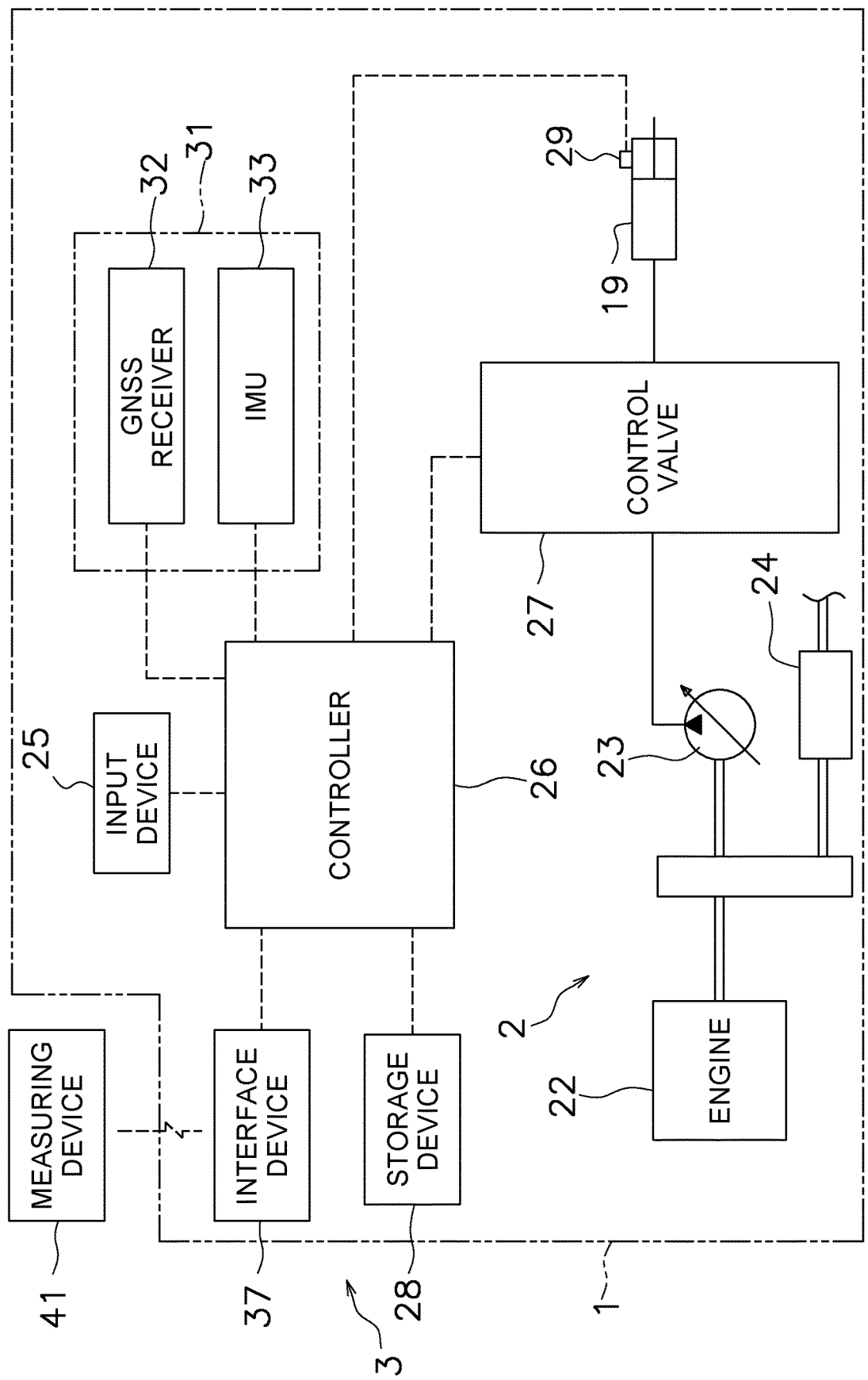
FIG. 12 is a block diagram illustrating a configuration according to a second modified example of the control system.

The actual topography 50 may be acquired with another device and is not limited to being acquired with the aforementioned position sensor 31. For example, as illustrated in FIG. 12, the actual topography 50 may be acquired with an interface device 37 that receives data from an external device. The interface device 37 may wirelessly receive actual topography data measured by an external measuring device 41. Alternatively, the interface device 37 may be a recording medium reading device and may receive the actual topography data measured by the external measuring device 41 via a recording medium.

The method for determining the target design topography 70 is not limited to the method of the above embodiment and may be changed. For example, the target design topography 70 may be a topography acquired by vertically displacing the actual topography 50 by a predetermined distance. Alternatively, the target design topography 70 may be inclined at a predetermined angle with respect to the horizontal direction. The predetermined angle may be set by the operator. Alternatively, the controller 26 may automatically determine the predetermined angle.

The processing for determining the work zone is not limited to the processing according to the above embodiment and may be changed. For example, in the above embodiment, the controller 26 modifies the temporary zone distance D0 according to the determination distance D. That is, the controller 26 determines the next temporary start position Ps1" according to the determination distance D. However, the controller 26 may modify the temporary zone distance D0 by another method different from the above embodiment.

Figure 13:
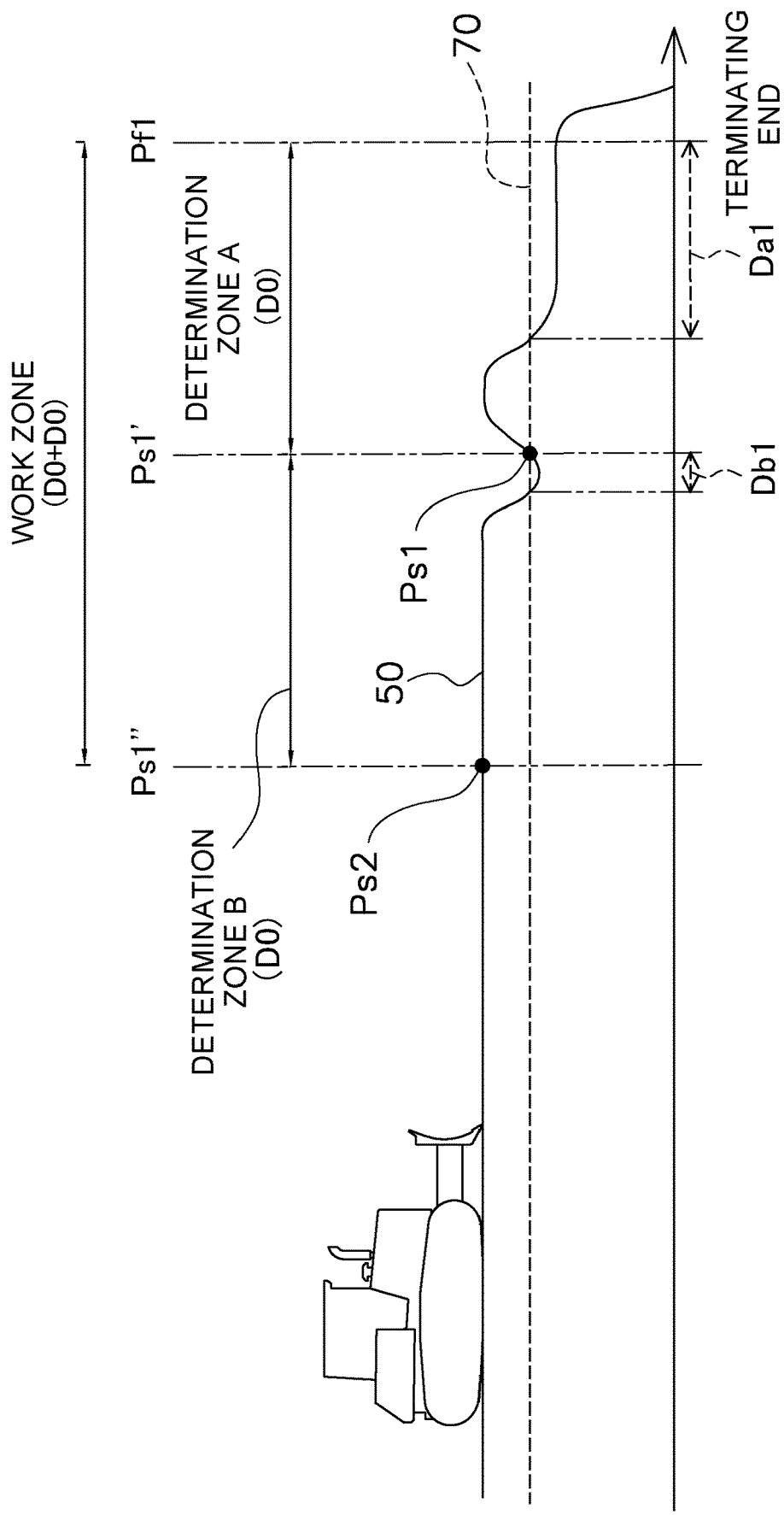
FIG. 13 is a diagram illustrating an example of a method for determining the work zone according to a modified example.

For example, as illustrated in FIG. 13, when the non-work distance D (=Da1) is not less than the predetermined threshold Th1 in the determination zone A, the controller 26 may skip the first start position Ps1 and start work from the second start position Ps2. In this case, an increased work zone can prevent a reduction in work efficiency. The distance between the first start position Ps1 and the second start position Ps2 may be the same as the temporary zone distance D0. Alternatively, the distance between the first start position Ps1 and the second start position Ps2 may be different from the temporary zone distance D0. The distance between the first start position Ps1 and the second start position Ps2 may be a constant value, or may be optionally determined by the controller 26.

Figure 14:
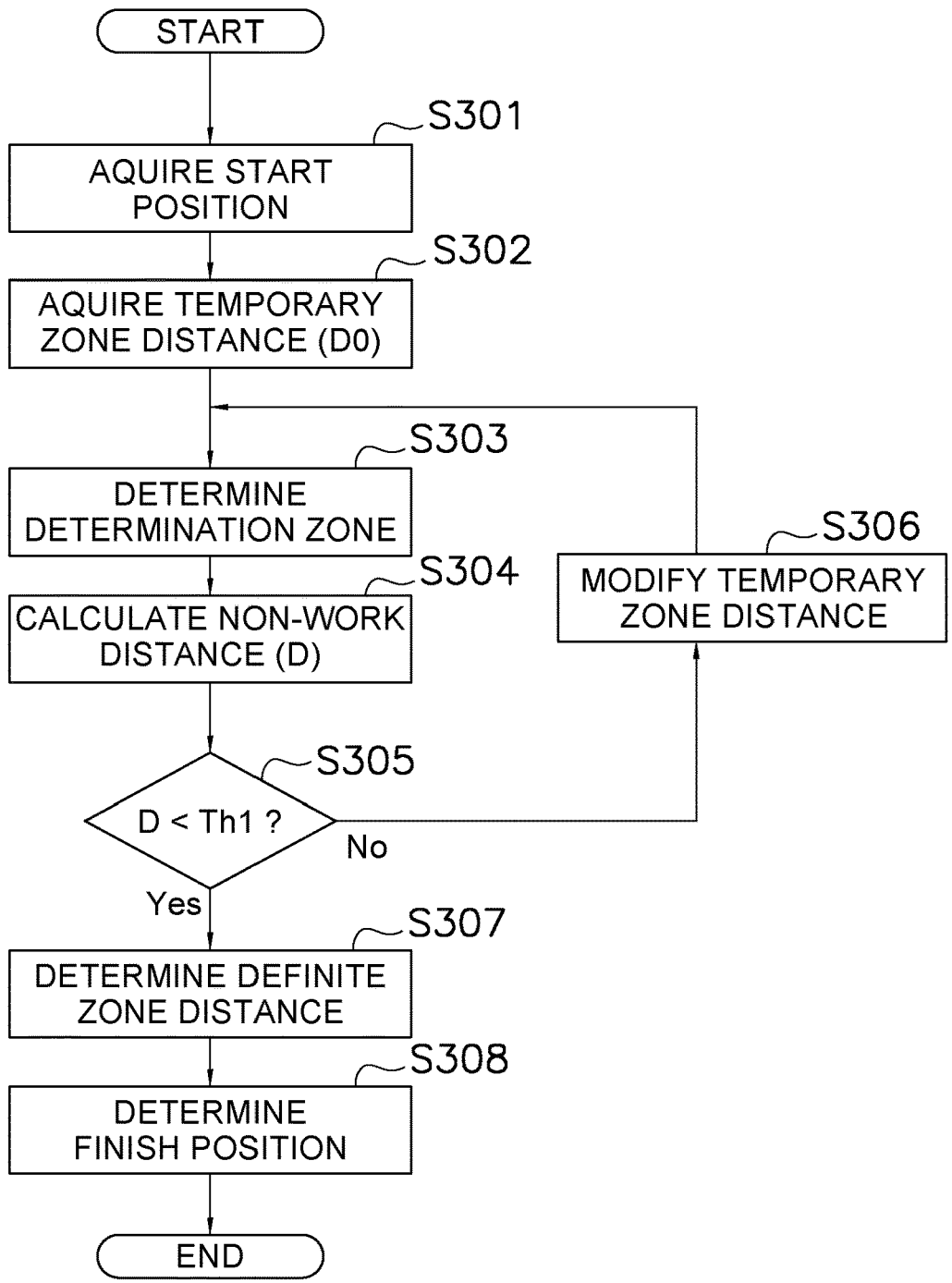
FIG. 14 is a flowchart illustrating processing for determining the work zone according to a second embodiment.
Figure 15:
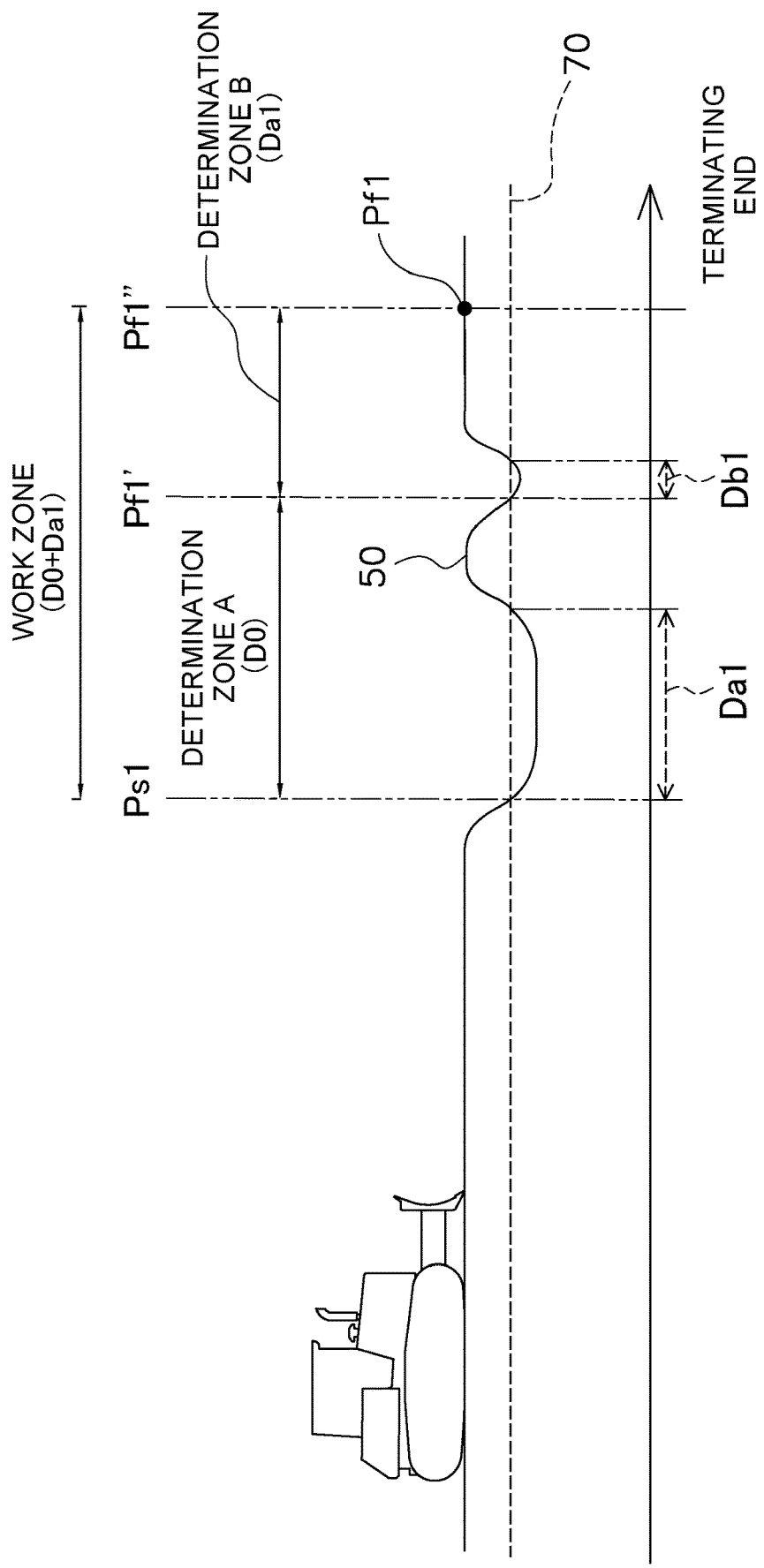
FIG. 15 is a diagram illustrating an example of a method for determining the work zone according to the second embodiment.

In the above embodiment, the controller 26 modifies the work zone by modifying the start position Ps1 based on the determination distance D. However, the controller 26 may modify the work zone by modifying the finish position Pf1 based on the determination distance D. For example, FIG. 14 is a flowchart illustrating processing for determining a work zone according to a second embodiment. FIG. 15 is a diagram illustrating a method for determining the work zone according to the second embodiment.

In step S301, the controller 26 may acquire the start position Ps1 instead of the finish position of the aforementioned step S201. In step S303, the controller 26 may determine, as the determination zone A, a position forward away from the start position Ps1 in the traveling direction of the work vehicle 1 by the temporary zone distance D0. When the non-work distance D (=Da1) in the determination zone A is equal to or greater than the predetermined threshold Th1, the controller 26 may modify the temporary zone distance from D0 into D0+Da1 based on the non-work distance D and modify the temporary finish position Pf1' into Pf1" in step S306.

In step S307, the controller 26 may determine, as the definite zone distance, the temporary zone distance D0+Da1 when the non-work distance D becomes less than the predetermined threshold Th1. In step S308, the controller 26 may determine, as the final finish position Pf1, a position forward away from the start position Ps1 by the definite zone distance D0+Da1. Subsequent to the finish position Pf1, the controller 26 may determine the other finish positions Pf2, Pf3, . . . with the same processing. The other processing is the same as the processing according to the aforementioned embodiment as illustrated in FIG. 7 to FIG. 11.

According to the present invention, a reduction in work efficiency can be prevented under automatic control of the work vehicle even when work is performed on an uneven topography.

The invention claimed is:

1. A control system for a work vehicle including a work implement, the control system comprising:
a controller configured to
determine a work zone at a work site,
determine a target design topography at least partially positioned below an actual topography at the work site,
specify a non-work zone that is a portion in which the actual topography is positioned below the target design topography in the work zone,
modify the work zone based on the non-work zone,
generate a first command signal to operate the work implement according to the modified work zone and the target design topography, and
control the work implement in accordance with the first command signal.

2. The control system for the work vehicle according to claim 1, wherein
the controller is further configured to modify the work zone based on a non-work distance of the non-work zone.

3. The control system for the work vehicle according to claim 2, wherein
the controller is further configured to, when the work zone includes a plurality of portions in which the actual topography is positioned below the target design topography, calculate a total distance of the plurality of portions as the non-work distance.

4. The control system for the work vehicle according to claim 2, wherein
the controller is further configured to increase the work zone according to the non-work distance.

5. The control system for the work vehicle according to claim 2, wherein
the controller is further configured to generate a second command signal to operate the work implement according to the work zone and the target design topography without modification when the non-work distance is less than a predetermined threshold.

6. The control system for the work vehicle according to claim 2, wherein
the controller is further configured to
determine a start position of the work zone, and
modify the start position based on the non-work distance.

7. The control system for the work vehicle according to claim 6, wherein
the controller is further configured to change the start position backward in a traveling direction of the work vehicle when the non-work distance is equal to or greater than a predetermined threshold.

8. The control system for the work vehicle according to claim 7, wherein
the controller is further configured to change the start position backward in the traveling direction of the work vehicle according to the non-work distance when the non-work distance is equal to or greater than the predetermined threshold.

9. The control system for the work vehicle according to claim 7, wherein
the controller is further configured to change the start position backward in the traveling direction of the work vehicle by a predetermined distance when the non-work distance is equal to or greater than the predetermined threshold.

10. The control system for the work vehicle according to claim 2, wherein
the controller is further configured to
determine a finish position of the work zone and a temporary zone distance,
determine a definite zone distance from the temporary zone distance when the non-work distance is less than a predetermined threshold,
increase the temporary zone distance and determine the definite zone distance from an increased temporary zone distance when the non-work distance is equal to or greater than the predetermined threshold, and
determine a start position of the work zone from the definite zone distance and the finish position.

11. A method executed by a controller in order to control a work vehicle including a work implement, the method comprising:
determining a work zone at a work site;
determining a target design topography at least partially positioned below an actual topography at the work site;
specifying a non-work zone that is a portion in which the actual topography is positioned below the target design topography in the work zone;
modifying the work zone based on the non-work zone;
generating a first command signal to operate the work implement according to the modified work zone and the target design topography; and
controlling the work implement in accordance with the first command signal.

12. The method according to claim 11, wherein
the modifying the work zone includes modifying the work zone based on a non-work distance of the non-work zone.

13. The method according to claim 12, wherein
the calculating the non-work distance includes, when the work zone includes a plurality of portions in which the actual topography is positioned below the target design topography, calculating a total distance of the plurality of portions as the non-work distance.

14. The method according to claim 12, wherein
the modifying the work zone includes increasing the work zone according to the non-work distance.

15. The method according to claim 12, wherein
the generating the first command signal includes generating a second command signal to operate the work implement according to the work zone and the target design topography without modification when the non-work distance is less than a predetermined threshold.

16. The method according to claim 12, further comprising:
determining a start position of the work zone,
the modifying the work zone including modifying the start position based on the non-work distance.

17. The method according to claim 16, wherein
the modifying the work zone includes changing the start position backward in the traveling direction of the work vehicle when the non-work distance is equal to or greater than a predetermined threshold.

18. The method according to claim 12, further comprising:
determining a finish position of the work zone and a temporary zone distance;
determining a definite zone distance from the temporary zone distance when the non-work distance is less than a predetermined threshold; and
increasing the temporary zone distance and determining the definite zone distance from an increased temporary zone distance when the non-work distance is equal to or greater than the predetermined threshold,
the modifying the work zone including determining a start position of the work zone from the definite zone distance and the finish position.

19. A work vehicle comprising:
a work implement; and
a controller configured to control the work implement,
the controller being configured to
determine a work zone at a work site,
determine a target design topography at least partially positioned below an actual topography at the work site,
specify a non-work zone that is a portion in which the actual topography is positioned below the target design topography in the work zone,
modify the work zone based on the non-work zone,
generate a command signal to operate the work implement according to the modified work zone and the target design topography, and
control the work implement in accordance with the first command signal.

* * * * *